United States Patent [19]

Nishikawa et al.

[11] Patent Number: 4,482,654

[45] Date of Patent: Nov. 13, 1984

[54] BINDER COATED FOUNDRY SAND GRAINS

[75] Inventors: Kazuyuki Nishikawa, Toyohashi; Katsumi Hirao, Akashi; Kazuhiko Mizuguchi, Yokohama; Hiroshi Suzuki, Okazaki, all of Japan

[73] Assignees: Daicel Chemical Industries, Ltd., Sakai; Shinto Kogio Ltd., Nagoya, both of Japan

[21] Appl. No.: 459,569

[22] Filed: Jan. 20, 1983

Related U.S. Application Data

[63] Continuation of Ser. No. 250,489, Apr. 2, 1981, abandoned.

[30] Foreign Application Priority Data

Apr. 11, 1980 [JP] Japan ................................ 55-47580

[51] Int. Cl.$^3$ .............................................. B28B 7/34
[52] U.S. Cl. ................................. 523/145; 106/38.5 R; 164/526; 428/404; 524/41; 524/44; 524/45
[58] Field of Search .................... 523/144, 145, 146; 428/404; 524/41, 44, 45; 164/526; 106/38.5 R

[56] References Cited

U.S. PATENT DOCUMENTS 3,046,146  7/1962  Woodhead et al. ........... 106/38.5 R
3,106,540  10/1963  Freedman ................. 260/DIG. 40

FOREIGN PATENT DOCUMENTS 777329  6/1957  United Kingdom ................ 523/147
886854  1/1962  United Kingdom ................ 523/147

Primary Examiner—Lorenzo B. Hayes
Attorney, Agent, or Firm—Flynn, Thiel, Boutell & Tanis

[57] ABSTRACT

Foundry sand grains coated with a binder composition which comprises 100 wt. parts of methylolmelamine or alkylated methylolmelamine and 5 to 100 wt. parts of a water-soluble organic compound having a hydroxyl group. The sand grains coated with the composition are effective in a low-temperature foundry, especially for forming a core in an aluminum-alloy foundry.

6 Claims, No Drawings

BINDER COATED FOUNDRY SAND GRAINS

This is a continuation of application Ser. No. 250,489 filed Apr. 2, 1981, now abandoned.

BACKGROUND OF THE INVENTION

1. Field of the Invention

The present invention relates to a binder for foundry sand. More particularly, the present invention relates to a binder for molds by which a foundry process is carried out at a relatively low temperature to form founded products of aluminum alloy, etc., inter alia, a binder for forming a core. Further, it relates to a binder for foundry sand comprising methylolmelamine or alkylated methylolmelamine and a water soluble organic compound having a hydroxyl group.

2. Description of Prior Art

The shell mold method, in which sand coated with a binder of a phenol resin is formed with heat to make a foundry mold is well known. However, if a core obtained by that method is applied in a low-temperature process, especially of an aluminum alloy, it is very difficult to take off the sand after molding because the disintegratability of the core is insufficient. Besides, such conventional sand coated with the binder of phenol resin generates a strong bad smell during core formation or when pouring the melting metal. An improvement in this working environment has been desired.

After intensive studies, the inventors have found that a binder composed of methylolmelamine or alkylated methylolmelamine and a water soluble organic compound having a hydroxy group, for example, monosaccharide, oligosaccharide, polysaccharide, water soluble cellulose derivatives, polyhydric alcohols and so on, has excellent properties as a binder for coated sand used in the low-temperature foundry.

It is known that methylolmelamine or an alkyl ether thereof, that is, alkylated methylolmelamine which is a reaction product of melamine and formaldehyde, can be used as a binder for foundry sand.

Sand coated with methylolmelamine or alkylated methylolmelamine is better than sand coated with a phenol resin in respect to the disintegrating property, but when cast and molded, generates a large volume of gases having a bad smell and has a great hygroscopicity. For these reasons, it has not been much used to date. It has no special advantage compared with the sand coated with phenol resin when iron is cast at a high temperature.

SUMMARY OF THE INVENTION

The inventors have found that when a mixture of methylolmelamine or alkylated methylolmelamine and a water-soluble organic compound having a hydroxyl group, for example, monosaccharide, oligosaccharide, polysaccharide, a water-soluble cellulose derivative, or a polyhydric alcohol is incorporated into a binder, the resulting binder can provide the coated sand with good disintegratability and no bad smell is generated on casting and molding. As the water-soluble organic compound having a hydroxyl group according to the invention, there may be preferably used saccharides such as glucose, xylose, raffinose, sucrose, dextran and amylose, polyhydric alcohols such as glycerin, diglycerin and propylene glycol and cellulose derivatives such as hydroxyethyl cellulose and sodium carboxymethyl cellulose.

The alkylated methylolmelamine is preferred to have an alkyl group containing one to four carbon atoms, such as methyl, ethyl, propyl, isopropyl and butyl, especially methyl.

A mixture ratio of methylolmelamine or alkylated methylolmelamine to the water-soluble organic compound in the binder of the present invention is preferred to be 10 parts to 5–100 parts, preferably 10 to 5–30, based on weight (reference to parts below are also parts by weight). In connection with the above-mentioned mixture ratio, when the water-soluble organic compound amounts to less than 5 parts, the binder generates strong stimulative gas when heated, and when it amounts to larger than 100 parts, the binder can provide the moulded core with only an insufficient strength so that separation of the core from the mold is degraded. In either case when the amount of the above-mentioned water-soluble organic compound is too much or too little, the coated sand has a large hygroscopicity.

The process of obtaining the coated sand from the binder of the present invention is, for example, that an aqueous solution of the binder and sand are kneaded together at the same time as water therein is vaporized with hot air, and sand is coated with a solution of one of the two components and then coated by a solution of the other component. This two-step coating process is optionally effected by using an organic solvent if the component is soluble in the organic solvent.

The amount of binder to sand is preferably 1.5–5 parts to 100 parts of sand.

It is added that about 0.1 g of a lubricant such as calcium stearate is incorporated into the binder and thereby, the coated sand is improved in respect to fluidity of the sand so that it can be charged into a core-molding mould in a good condition. When a core is molded from the thus obtained coated sand, it is filled into the mold and heated at 200°–300° C. for 30 secs. –2 mins. A core having a good disintegrability, suitable for a low-temperature foundry can be obtained according to the invention, having a good strength and furnace grains.

The present invention will be described with examples. All references to part and % in the Examples are on a weight basis.

EXAMPLE 1

To 100 parts of a 10% aqueous solution of cellulose acetate having an acetylation degree of 28.8%, a limiting viscosity of 0.25 in an aqueous solution thereof at 25° C. (some kinds of cellulose acetate are soluble in water when they have a low acetylation degree and low molecular weight) was added 15.3 parts of an 80% aqueous solution of methylated methylolmelamine solution, Sumirez 613 (trademark) available from Sumitomo Kagaku. Then the mixture was stirred for 10 mins. to obtain an aqueous binder solution. To 100 parts of Silica sand, Flattery sand available from Australia, was added 14.3 parts of the above-obtained aqueous binder solution and the mixture was kneaded in an open stirring tub while exposed to warm air at about 70° C. After 30 mins. had passed, the sand was kneaded together with 0.1 part of calcium stearate as a lubricant to give a sample of coated sand.

EXAMPLE 2

Coated sand was obtained in the same manner as in Example 1, except that to 10 parts of a 10% aqueous solution of hydroxyethyl cellulose having a mole number of added ethylene oxide per glucose unit, MS, of 1.8, an etherification degree, DS, of 1.2 and a viscosity of 90 cps in a 5% aqueous solution thereof were added 9 parts of xylose and 1.25 parts of an 80% aqueous solution of methylated methylolmelamine, Sumirez 613 (trademark) available from Sumitomo Kagaku. The mixture was then kneaded under stirring, and to 100 parts of silica sand was added 5.5 parts of the thus-obtained aqueous binder solution.

EXAMPLE 3

Coated sand was obtained in the same manner as in Example 1, except that to 100 parts of silica sand was added 9.3 parts of an aqueous binder solution obtained by mixing 40 parts of a 25% aqueous solution of dextran having an average molecular weight of 10400 and 6.5 parts of a 77% aqueous solution of methylated methylolmelamine, Sumimal M-30W (tradename) available from Sumitomo Kagaku.

EXAMPLE 4

Coated sand was obtained in the same manner as in Example 1, except that to 100 parts of silica sand was added 8.45 parts of an aqueous binder solution obtained by mixing and stirring 50 parts of a 20% aqueous solution of sucrose and 11 parts of methylolmelamine, Nikaresin S-260 (trademark) produced by Nihon Carbide Co., for 20 minutes.

EXAMPLE 5

Coated sand was obtained in the same manner as in Example 1, except that to 100 parts of silica sand was added 7.2 parts of an aqueous binder solution obtained by mixing and stirring for 30 mins. 14 parts of a 30% aqueous solution of glucose, 0.53 part of sodium carboxymethyl cellulose having an etherification degree per glucose unit, DS, of 0.8 and a viscosity of 85 cps in a 4% aqueous solution thereof, 0.53 parts of glycerin and 2.8 parts of an 80% aqueous solution of methylated methylolmelamine, Sumitex M-3 (trademark) produced by Sumitomo Kagaku.

EXAMPLE 6

To 100 parts of silica sand (Flattery sand available from Australia) was added 7 parts of a 30% aqueous solution of glucose and the mixture was kneaded for 25 mins. while exposed to warm air at about 70° C. in a universal stirrer, Kenmixchef 901 type (trademark) available from Aikousha Manufactory, to evaporate water. Then to the thus-obtained product were added 4.5 parts of a liquid mixture of 5 parts of an 80% aqueous solution of methylated methylolmelamine, Sumirez 613 available from Sumitomo Kagaku, and 15 parts of acetone. Further, the mixture was kneaded for a further 10 mins. while exposed to warm air at 70° C. Thereafter 0.15 part of calcium stearate was added thereto to obtain the coated sand.

COMPARATIVE EXAMPLE 1

Coated sand was obtained in the same manner as in Example 1, except that to 100 parts of silica sand was added 7.5 parts of a 40% aqueous solution of sucrose as a binder solution.

COMPARATIVE EXAMPLE 2

Coated sand was obtained in the same manner as in Example 1, except that to 100 parts of silica sand was added a binder solution mixture of 3.5 parts of a 20% aqueous solution of dextran having an average molecular weight of 10400 and 3.0 parts of a 77% aqueous solution of methylated methylolmelamine, Sumimal M-30 W (trademark) produced by Sumitomo Kaguku.

COMPARATIVE EXAMPLE 3

Coated sand was obtained in the same manner as in Example 1, except that to 100 parts of silica sand was added 4.0 parts of a 77% aqueous solution of methylated methylolmelamine Sumimal M-30W (trademark) produced by Sumitomo Kagaku, dissolved in 16 parts of acetone to give a binder solution.

COMPARATIVE EXAMPLE 4

Coated sand was obtained in the same manner as in Example 1, except that to 100 parts of silica sand was added 30 parts of a 10% aqueous binder solution of sodium carboxymethyl cellulose having an etherification degree per glucose unit, DS, of 0.85, and a viscosity of 12 cps in a 1% aqueous solution thereof.

The coated sand samples obtained in Examples 1-6 and Comparative Examples 1-4 were tested in respect to resistance to breaking. For the purpose test pieces were made according to "testing method for powdery resin for shell molds" described in JIS K6910. Temperatures of the used molds were 10°±10° C. and heating period of time was 1 min. during the molding step. For the purpose of comparing the molded test pieces with each other regarding disintegratability, they were wrapped in an aluminum foil and were kept in an electric furnace at 520° C. for 3 mins. They were then allowed to get cool. They were measured with regard to remaining resistance to breaking according to which a residual percentage of strength (remaining resistance to breaking initial breaking resistance) were calculated two kinds (A & B), of commercially available Shell sand were tested as controls in the same manner as above and the obtained results as shown in Table 1.

TABLE 1

| Sample | resistance to breaking (kg/cm$^2$) | residual percentage of strength (%) | stimulating smell of the molding | remarks |
|---|---|---|---|---|
| Example 1 | 31 | 8 | a little | |
| Example 2 | 31 | 6 | scarcely | |
| Example 3 | 32 | 8 | a little | |
| Example 4 | 35 | 12 | scarcely | |
| Example 5 | 37 | 10 | " | |
| Example 6 | 32 | 14 | " | |
| Comparative Example 1 | unmeasurable | — | — | can not be parted from the mold, get out of shape. |
| Comparative Example 2 | 34 | 15 | smelled much | |
| Comparative Example 3 | 38 | 18 | smelled much | |
| Comparative Example 4 | unmeasurable | — | — | can not be parted from the mold, get out of shape. |
| Control 1 (A) | 41 | 38 | smelled much | |
| Control 2 (B) | 20 | 30 | smelled much | |

The coated sand in which the binder of the present invention was used had excellent moldability and disintegratability, and generated no stimulating smell during the molding step.

The embodiments of the invention is which an exclusive property or privilege is claimed are defined as follows:

1. Grains of foundry sand coated with a binder composition, said binder composition consisting essentially of a mixture of (A) 10 parts by weight of a material selected from the group consisting of methylolmelamine and alkylated methylolmelamine, and (B) from 5 to 100 parts by weight of a water-soluble organic material selected from the group consisting of glycerin, diglycerin, propylene glycol, hydroxyethyl cellulose, sodium carboxymethyl cellulose, water-soluble cellulose acetate and mixtures thereof, the amount of said binder composition being in the range of from 1.5 to 5 parts by weight per 100 parts by weight of said grains of sand, said coated grains of sand having been prepared by kneading a mixture of sand grains and a solution of said binder composition in a solvent and then removing the solvent to obtain dry coated sand grains.

2. Grains of foundry sand according to Claim 1, in which said water-soluble organic material consists essentially of water-soluble cellulose acetate.

3. Grains of foundry sand according to Claim 1, in which said water-soluble organic material consists essentially of hydroxyethyl cellulose.

4. Grains of foundry sand according to Claim 1, in which said water-soluble organic material consists essentially of sodium carboxymethyl cellulose.

5. Grains of foundry sand according to Claim 1, in which said water-soluble organic material is selected from the group consisting of glycerin, diglycerin and propylene glycol.

6. A sand mold for metal casting, said mold being made of grains of sand as claimed in Claim 1.

* * * * *